US011119877B2

(12) United States Patent
Anshul et al.

(10) Patent No.: US 11,119,877 B2
(45) Date of Patent: Sep. 14, 2021

(54) COMPONENT LIFE CYCLE TEST CATEGORIZATION AND OPTIMIZATION

(71) Applicant: DELL PRODUCTS L.P., Round Rock, TX (US)

(72) Inventors: Shanir Anshul, Hyderabad (IN); Shibi Panikkar, Bangalore (IN); Xiang Cao, Shanghai (CN); Dong Ji, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 16/571,376

(22) Filed: Sep. 16, 2019

(65) Prior Publication Data

US 2021/0081291 A1    Mar. 18, 2021

(51) Int. Cl.
*G06F 11/273* (2006.01)
*G06F 11/263* (2006.01)

(52) U.S. Cl.
CPC .......... *G06F 11/273* (2013.01); *G06F 11/263* (2013.01)

(58) Field of Classification Search
CPC .... G06F 11/006; G06F 11/008; G06F 11/263; G06F 11/273; G06F 2201/83
See application file for complete search history.

(56) References Cited

U.S. PATENT DOCUMENTS

| 9,056,556 | B1 | 6/2015 | Hyde et al. |
| 9,079,505 | B1 | 7/2015 | Hyde et al. |
| 9,690,265 | B2 | 6/2017 | Casilli |
| 10,733,341 | B1* | 8/2020 | Cascioli ............... H04L 9/3297 |
| 2003/0120457 | A1 | 6/2003 | Singh et al. |
| 2005/0004789 | A1 | 1/2005 | Summers |
| 2006/0064481 | A1 | 3/2006 | Baron et al. |
| 2017/0268948 | A1 | 9/2017 | List et al. |
| 2018/0134171 | A1 | 5/2018 | Hyde et al. |
| 2019/0372755 | A1* | 12/2019 | Tadie ................... G06Q 20/382 |

FOREIGN PATENT DOCUMENTS

| CA | 2386788 A1 | 12/2001 | |
| WO | WO-03067386 A2 * | 8/2003 | ............ G06Q 10/10 |
| WO | 2013112275 A1 | 8/2013 | |

* cited by examiner

*Primary Examiner* — Joseph R Kudirka
(74) *Attorney, Agent, or Firm* — Jackson Walker LLP; Christopher J. Rourk

(57) ABSTRACT

A system for testing electrical components comprising a supplier test system operating on a first processor and configured to generate test data for a component and to store the component test data on a block chain. A board level test system operating on a second processor and configured to generate test data for a board and to store the board test data on the block chain. A test tracking system configured to request a first key to access to the component test data and a second key to access the board test data and to store the first key and the second key.

20 Claims, 7 Drawing Sheets

COMPONENT LIFE CYCLE TEST CATEGORIZATION AND OPTIMIZATION

TECHNICAL FIELD

The present disclosure relates generally to manufacturing process control, and more specifically to a system and method for component life cycle test categorization and optimization that utilizes a blockchain ledger for optimized testing data control.

BACKGROUND OF THE INVENTION

In a manufacturing process, it is known to perform testing at a number of different points. However, because these tests are often performed by different organizations that are not coordinated as part of a single administration, it is difficult or impossible to share data from those tests.

SUMMARY OF THE INVENTION

A system for testing electrical components comprising a supplier test system operating on a first processor and configured to generate test data for a component and to store the component test data on a block chain. A board level test system operating on a second processor and configured to generate test data for a board and to store the board test data on the block chain. A test tracking system configured to request a first key to access to the component test data and a second key to access the board test data and to store the first key and the second key.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
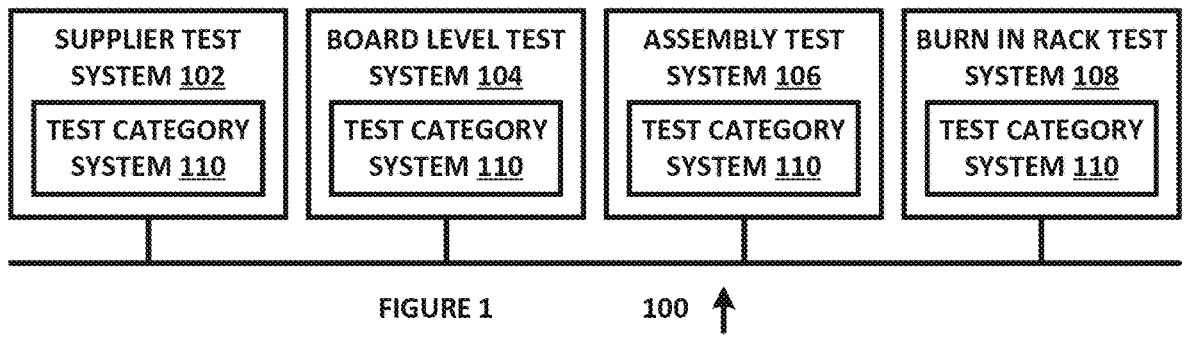
FIG. 1 is a diagram of a system for coordinated product testing, in accordance with an example embodiment of the present disclosure.
Figure 8:
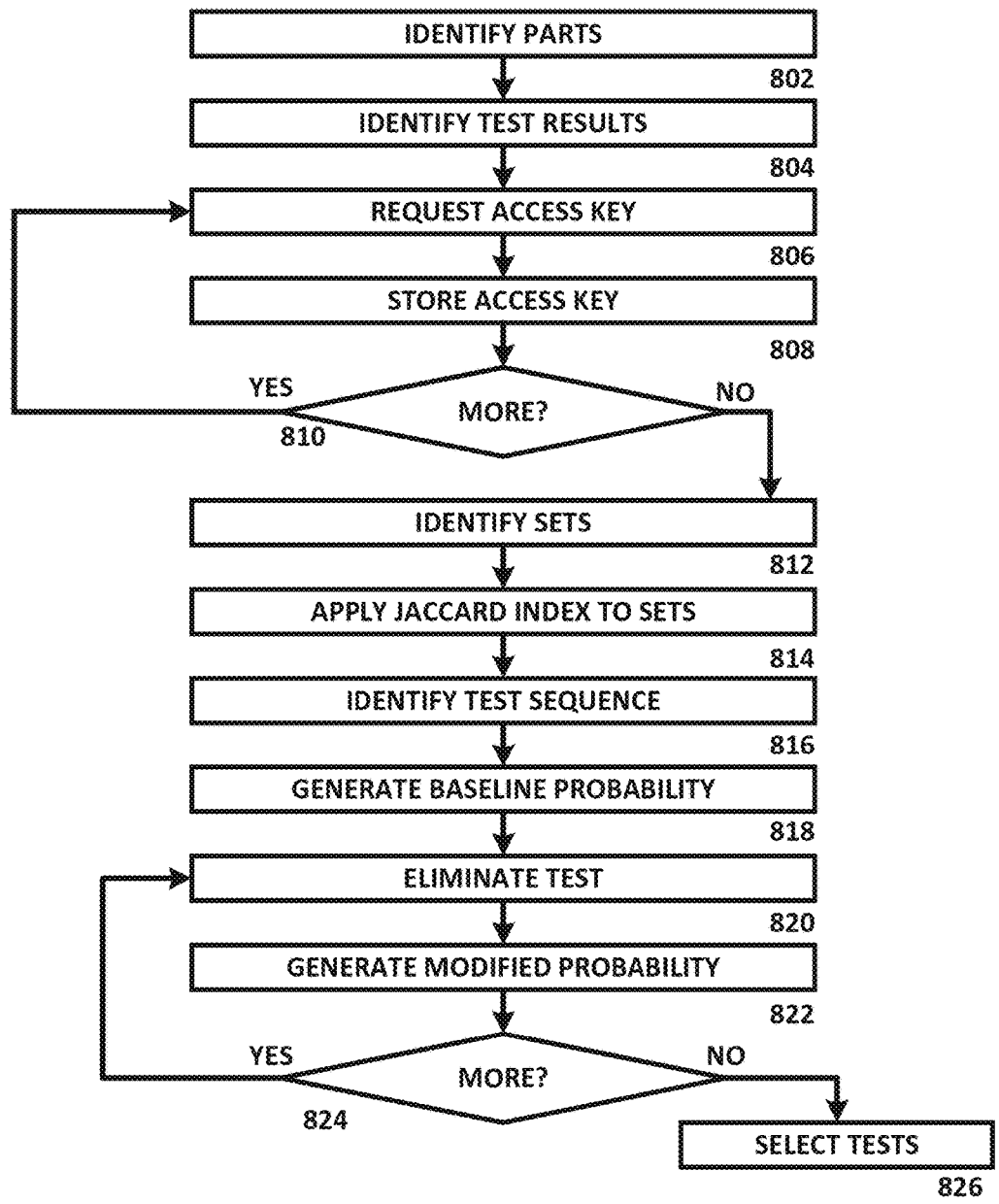
FIG. 8 is a flow chart of an algorithm for reducing manufacturing test requirements, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In manufacturing processes, the number of integration points and independent commodity tests performed at those integration points has increased. As a result, a number of tests, such as module tests, are repeated even when those modules have not been affected by a manufacturing process. A system and method are disclosed that can identify module tests that can be eliminated during the manufacturing cycle to achieve lower production cost.

In one example embodiment, the accuracy of commodity testing can be improved with a similarity index on parts used to build finished goods. An added weighting factor can be applied to internal or external criteria that may impact the manufacturing test cycle. In order to identify such weighting factors, test data from original equipment manufacturer (OEM) tests, original design manufacturer (ODM) or other sources is collected. Classifiers are used to identify identical tests that are performed at multiple places in the manufacturing life cycle, which are used to identify how to complete integration testing faster and more efficiently. In this manner, it can be determined which tests can be eliminated at various manufacturing life cycle points. The test results can be shared, and a log file can be created using a distributed ledger in a block chain. The present disclosure thus provides a system and method for managing a complex design with a large number of parts that are tested independently at different points.

The present disclosure can also use manufacturing production process data to estimate a number of various defects in a new design or an existing product. The calculation procedure, test strategy analysis and alternatives are disclosed, and use the different test locations and test coverage. The calculations can be used to obtain detailed information of test efficiency, yield and escaped defects in each test operation.

One aspect of the present disclosure provides a network of parts that can be used in building finished goods, and a map of test result for each part that can be used to develop data insight, as well as an analysis of the relationship and information flow between a supplier part and an assembled part. The present disclosure can be used to understand how individual test modules are related to each other, and to identify the impact they have on each other when any test module fails or misses testing.

The present disclosure provides a unique artificial intelligence-based classification process, and a solution to remove duplicate testing with end to end test tracking and follow-up steps on test coverage. The process also allows a user to identify critical test modules that need to be executed for a given commodity.

Profile-based testing is currently used to perform different component tests. When a new product is introduced, a factory team will add modules manually based on expertise and prior experience. This manual process of adding test modules introduces duplicate module tests across a manufacturing location, and fails to use supplier insights.

FIG. 1 is a diagram of a system 100 for coordinated product testing, in accordance with an example embodiment of the present disclosure. System 100 includes supplier test system 102, board level test system 104, assembly test system 106 and burn-in rack test system 108, each of which include test category system 110, and which can be implemented in hardware or a suitable combination of hardware and software.

Supplier test system 102 can include a processor and one or more algorithms that are configured to operate on the processor to control one or more tests, such as engineering validation tests, design validation tests, production validation tests, electrical tests, operational cycle tests or other suitable tests, and to assign the test results to a category. Supplier test system 102 can perform supplier-specific tests, industry standard tests or other suitable tests, such as those discussed further herein.

Board level test system 104 can include a processor and one or more algorithms that are configured to operate on the processor to control one or more tests, such as engineering validation tests, design validation tests, production validation tests, electrical tests, operational cycle tests or other suitable tests, and to assign the test results to a category. Board level test system 104 can perform printed circuit board-specific tests, industry standard tests or other suitable tests, such as those discussed further herein.

Assembly test system 106 can include a processor and one or more algorithms that are configured to operate on the processor to control one or more tests, such as engineering validation tests, design validation tests, production validation tests, electrical tests, operational cycle tests or other suitable tests, and to assign the test results to a category. Assembly test system 106 can perform assembly-specific tests, industry standard tests or other suitable tests, such as those discussed further herein.

Burn-in rack test system 108 can include a processor and one or more algorithms that are configured to operate on the processor to control one or more tests, such as engineering validation tests, design validation tests, production validation tests, electrical tests, operational cycle tests or other suitable tests, and to assign the test results to a category. Burn-in rack test system 108 can perform burn-in rack-specific tests, industry standard tests or other suitable tests, such as those discussed further herein.

Test category system 110 can include a processor and one or more algorithms that are configured to operate on the processor to receive the supplier-specific tests, the board-specific tests, the assembly-specific tests, the burn-in rack-specific tests, the industry standard tests or other suitable tests, such as those discussed further herein. In one example embodiment, test category system 110 can assign the test results to a specific category, can add or delete categories as a function of test results for a supplier, board, component, assembly, rack or other suitable classes, such as after it has been determined that tests can be eliminated or in other suitable manners.

In one example embodiment, manufacturing entities can include component manufacturers, board manufacturers, PCB assemblers and product manufacturer, and their work and products can be coordinated to produce a finished good. The prior art test results were not shared between each other, which led to multiple execution of the entire sets of test modules, irrespective of whether the previous tests resulted in passing or failing results. The present disclosure includes a test classification system that can be implemented using an algorithm that helps the operator to identify test modules that can be omitted, test modules that should be re-executed, new test modules and other suitable testing.

In one example embodiment, test modules can include an events and process orchestrator that stores data that identifies the date, time, location and other specific data associated with component or assembly arrival at a facility, which facilitates data planning or maneuvering by generating user controls and displays, and which performs other suitable functions. A request/response correlator can collaborate with a block chain that is associated with a component to access prior test results. An intelligent testing module classification component can identify test modules and their pattern within test results.

A product life cycle can include an induction stage, a growth stage, a maturity stage and a decline stage, as well as other suitable stages and classifications. Each of these stages can have associated characteristics that require a different test strategy for each stage. For example, in the beginning of the product life cycle development, many tests are usually performed to ensure that design-related issues are identified to assist with design reviews and prototype builds. This higher initial testing can be helpful for consideration of all relevant testability aspects, and can be dependent on the design of the product.

Better test coverage can be achieved by preparing a list of potential tests for each stage of the product life cycle. Characterizing a test coverage as a percentage of pass or fail does not necessarily represent the correct test coverage, because a variety of external factors can affect the test results during the manufacturing of a product, such as which vendor supplied components, what the test coverage was at the vendor for each supplied test, whether a diagnostic tool provided by a vendor was packaged into a multiple test module, whether a board manufacturer and an assembler are in same city or country, whether there is a cost benefit for performing early tests versus late tests in a manufacturing life cycle, and other suitable variables.

Where there are number of different vendors supplying components, the test strategy used by each vendor can differ from that of other vendors. Typically, a vendor that provides a component will provide a diagnostic test tool, but will not control when that diagnostics tool is run at a stage of the manufacturing life cycle. Without a system and method to coordinate testing, manufacturing teams will run diagnostic tools at many different stages, which leads to duplication of tests without any additional benefit. These diagnostic tools test different aspects of functionality.

Sometimes, duplicate test can be useful, but might not be performed. For example, a memory test might not be performed for a board-level test in China, but the board might then be shipped to Mexico for assembly and burn-in rack testing. Likewise, when a vendor switches from development testing to mass production testing, less elaborated testing is typically used, because the component is typically more stable and a reduction in testing leads to a reduction in the component production cost.

The present disclosure provides a network for identifying parts that are used in building a product and maps test results for each part, to develop data insight and for other suitable purposes. Data can be collected from an inbound advanced shipping notice (ASN), piece part identification (PPID) data from part to assembly unit, integrating other source system data such as the system used to capture receiving and shipping data, and accumulating it for the analysis using AI.

Figure 2:
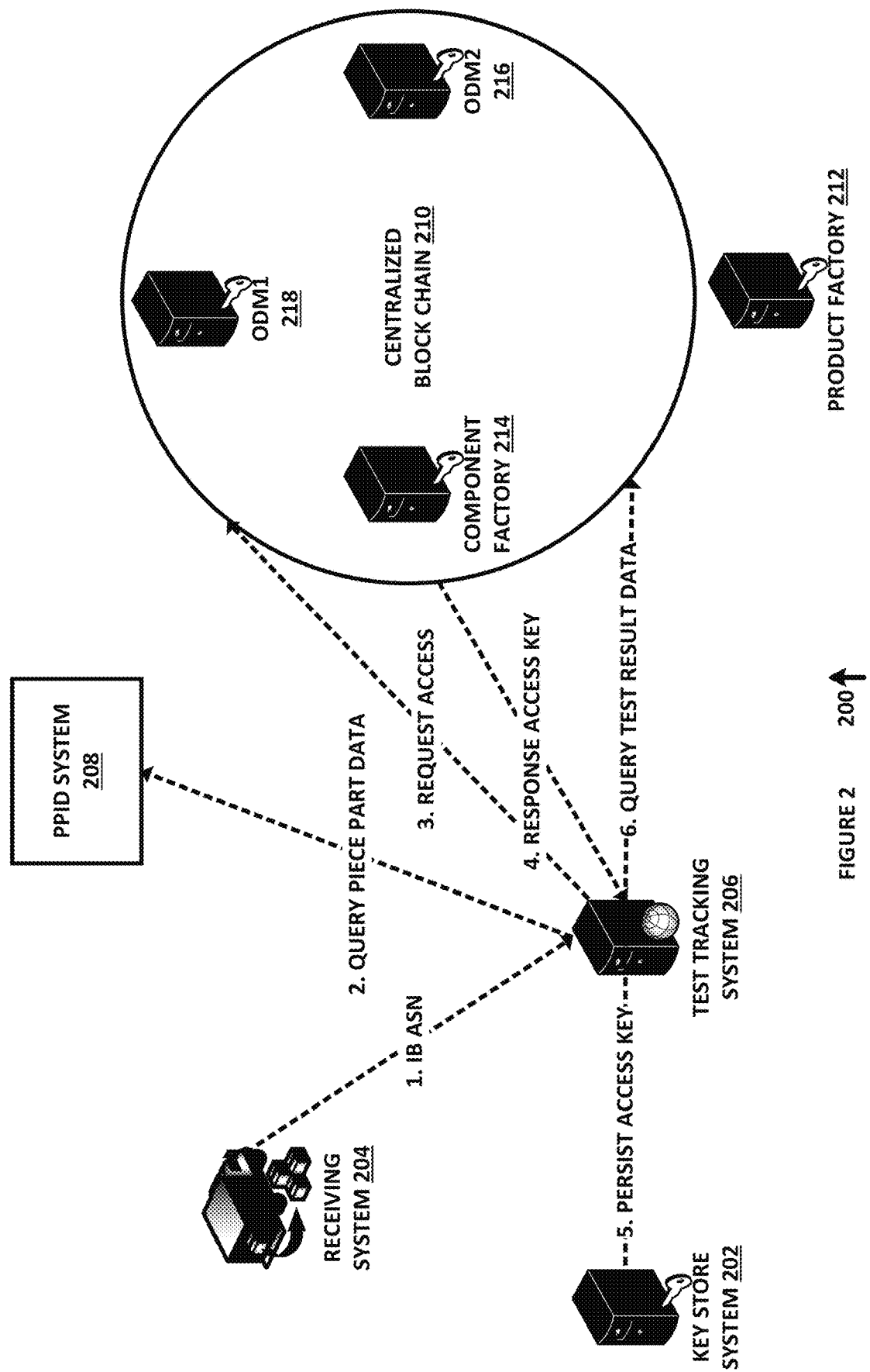
FIG. 2 is a diagram of a system for tracking testing data, in accordance with an example embodiment of the present disclosure.

FIG. 2 is a diagram of a system 200 for tracking testing data, in accordance with an example embodiment of the present disclosure. System 200 includes key store system 202, receiving system 204, test tracking system 206, PPID system 208, centralized block chain 210, product factory 212, component factory 214, ODM2 216 and ODM1 218, each of which can be implemented in hardware or a suitable combination of hardware and software.

Test tracking system 206 is configured to obtain inbound ASN data from receiving system 204, and to query PPID system 208. Test tracking system 206 can then request access to centralized block chain 210, and receives a response access key that is used to persist the access key at key store 202. Test tracking system 206 can then query test result data from product factory 212, ODM1 218, ODM2 216 and component factory 214.

For example, a component factory 214 can supply a camera for placement on a board at ODM1 218, which can then be moved to ODM2 216 for assembly, and then built into the final product at product factory 212. The inbound ASN can be received from receiving system 204 by test tracking system 206. Test tracking system 206 can query PPID data from PPID system 208 along with a supplier name to gather test results from each different supplier involved in the supply chain. Test tracking system 206 can also request data access by providing PPID data from component factory 214, which can generate an access key that can be persisted locally at key store 202 and used for querying test results.

The manufacturer entities such as component factory 214, ODM1 218, ODM2 216 and product factory 212 are configured to capture test result data and to encode the data into a block chain associated with the component. Because the test data is tokenized in the block chain, access to the test data can be securely provided to parties who are involved in manufacturing life cycle.

Figure 3:
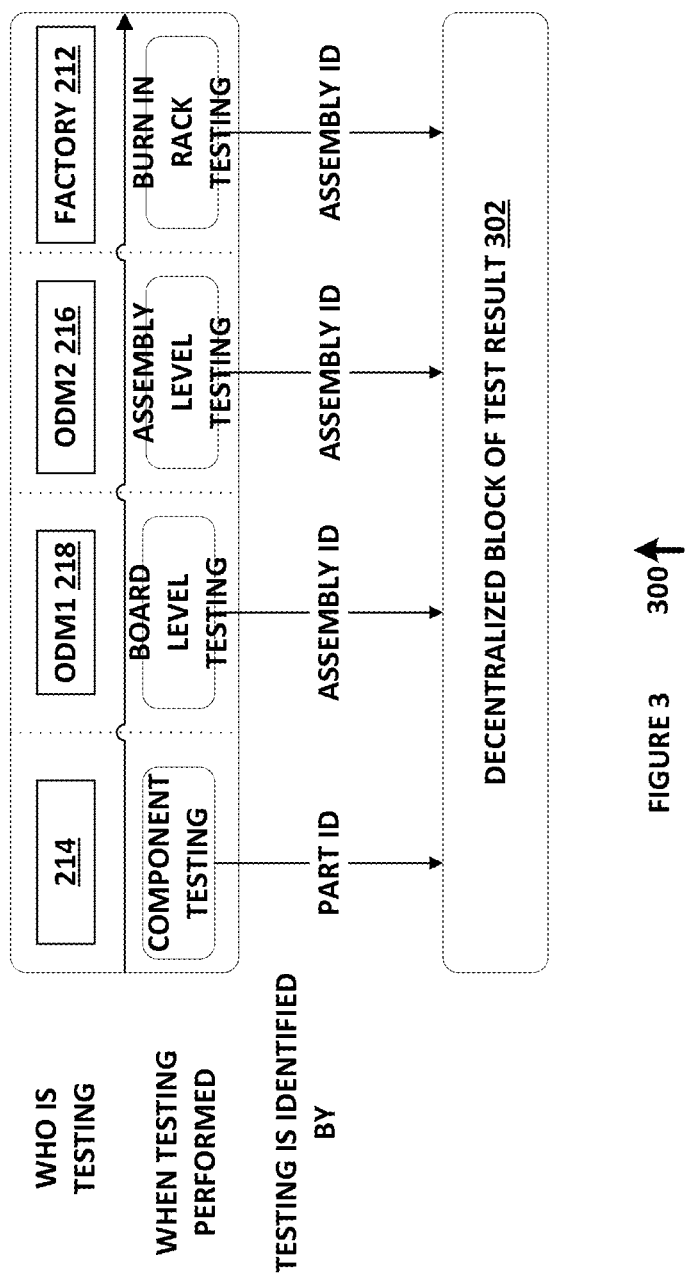
FIG. 3 is a diagram of testing systems, in accordance with an example embodiment of the present disclosure.

FIG. 3 is a diagram 300 of testing systems, in accordance with an example embodiment of the present disclosure. Once access to data is established, the next goal is to find groups of test result that belong to the same system. In one example embodiment, the block chain can be read for all parts that compose a system, after which a cluster file can be used to generate a hierarchical graph. The graph can be used by the disclosed system to travel through predecessors or successors to identify each test that is being performed by the manufacturing identities, which test was successful, tests that were performed multiple times for any given part and other suitable data.

Figure 4:
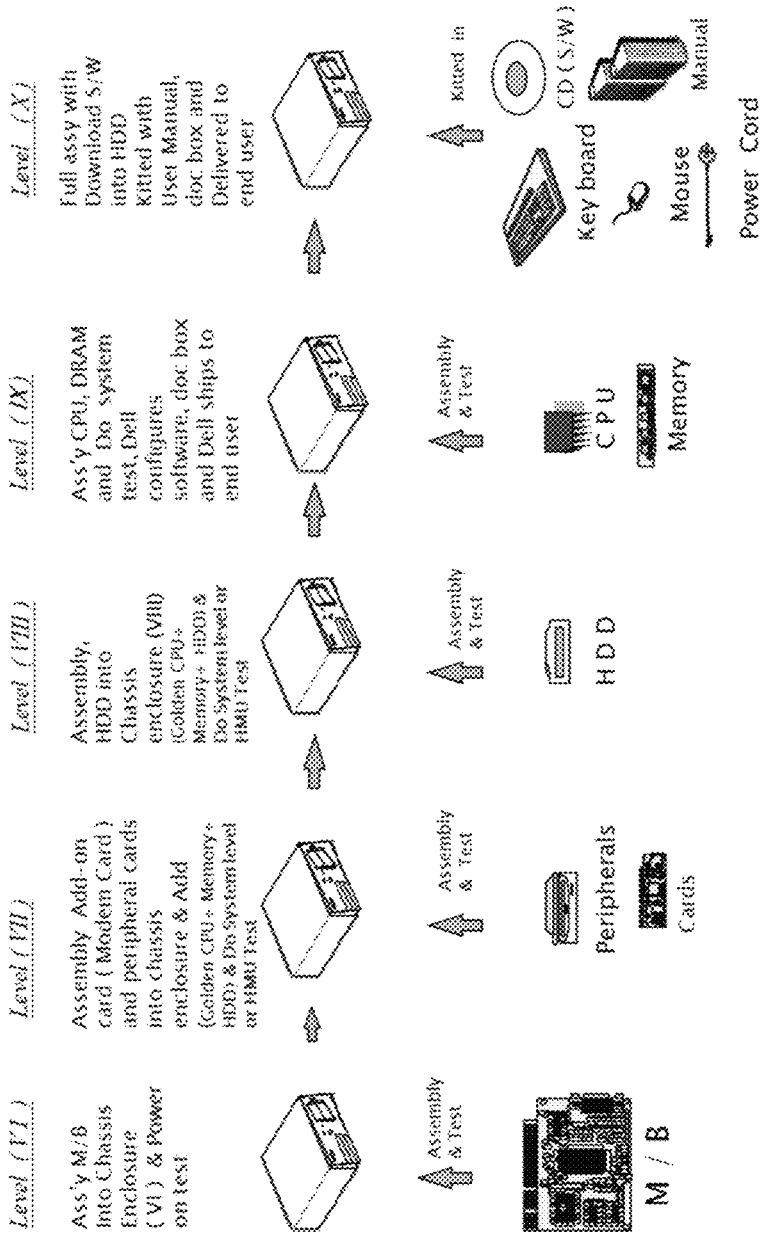
FIG. 4 is a diagram showing examples of testing that can be performed at different manufacturing stages.

FIG. 4 is a diagram 400 showing examples of testing that can be performed at different manufacturing stages. At each stage, test tracking system 206 can interface with test category system 110 to generate test data and to encode the test data into a block chain associated with the specific product that is being tested.

Figure 5:
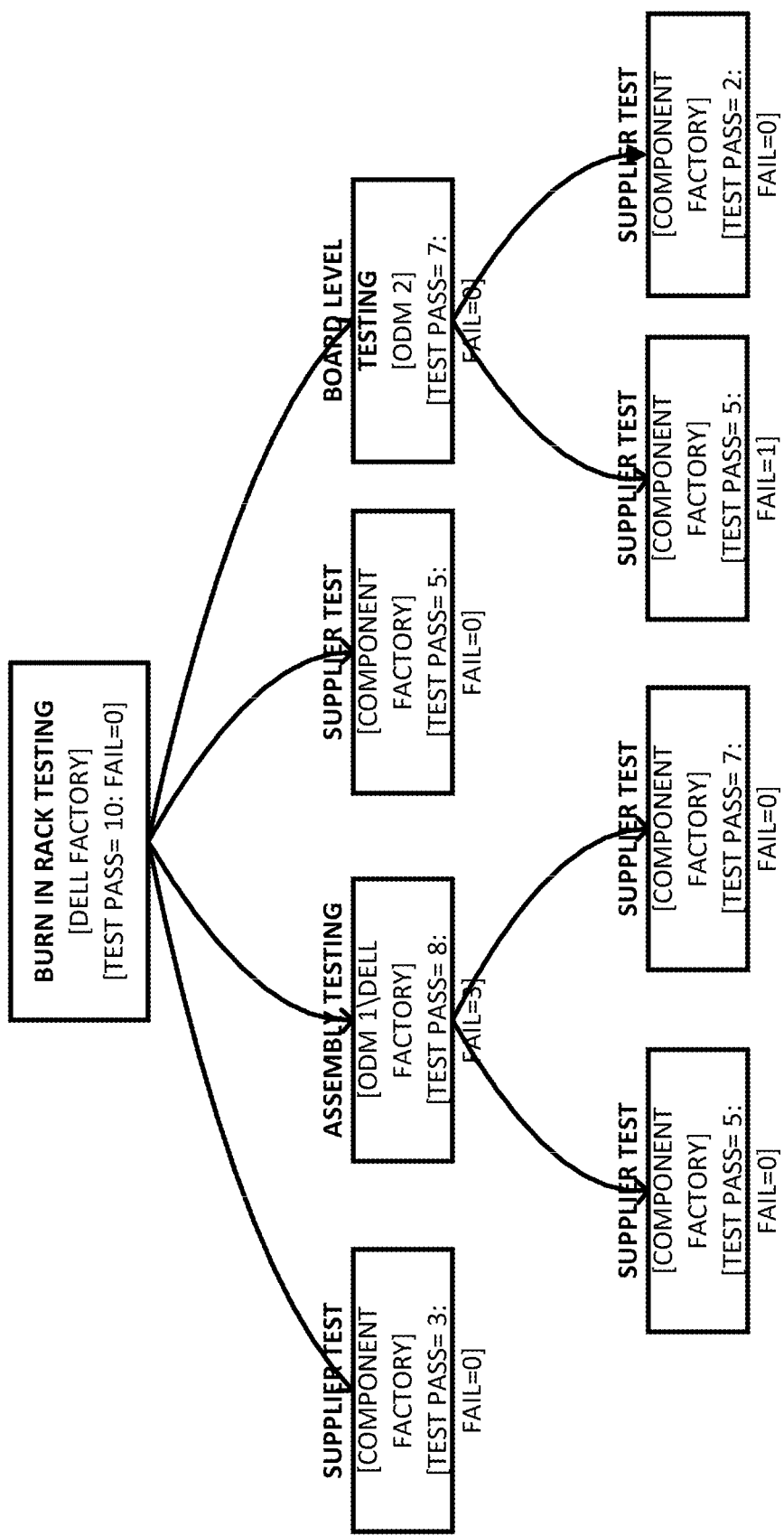
FIG. 5 is a graphical representation of a product hierarchy and associated test results captured by component and assembly at manufacturing lifecycles, in accordance with an example embodiment of the present disclosure.

FIG. 5 is a graphical representation of a product hierarchy 500 and associated test results captured by component and assembly at manufacturing lifecycles, in accordance with an example embodiment of the present disclosure. Product hierarchy 500 demonstrates the association of test results for each part and how those test results are linked. This test data can be used by a classification module to query test results globally over the blockchain, selectively on a list for a specified edge or cluster of interest, or in other suitable manners. Once a relationship is established between test results, those test results can be compared across parts, platform or supplier. The test results for a given system can then be compared with historical data. If a new product is launched, then there will be no historical data for that product, but test data for similar system configurations can be used. For example, a product that uses the same parts to build the same type of new product can be used as a starting point. The ability to classify test data from different manufacturing points and different products can allow a list of test module needs to be identified. The degree of similarity between two system configurations can be estimated using the Jaccard Index:

Jaccard Index=(the number of similar components in both sets)/(the number of components in either set)

The Jaccard Index can be represented in statistical set notation as:

$$J(S_1,S_2)=|S_1 \cap S_2|/|S_1 \cup S_2|$$

For two sets as $S_1\{\ \}$ and $S_2\{\ \}$, the part numbers can be copied from two system configurations to respective sets $S_1\{\ \}$ and $S_2\{\ \}$. Next, the number of parts which are shared between both sets is identified. The total number of parts in both sets (common parts and uncommon parts) is identified next. The number of common parts (Step 1) is divided by the total number of parts (Step 2).

In one example, this process can be applied to two systems where all parts are obtained from each system, such as where system 1 $S_1$ is "notebook 1" from Family=A and system 2 $S_2$ is "notebook 1" from Family=A.

$$S_1=\{YR6MN,A,Y4TWT,X9JDY,3YX8R,HD7RD, HND16,H0YJC\}$$

$$S_2=\{YR6MN,A,Y0TWT,X0JDY,3YX0R,HD0RD, HND00,H0YJC\}$$

$$J(S_1,S_2)=|S_1 \cap S_2|/|S_1 \cup S_2|=3/8=0.375$$

A part similarity index can be generated based on parts used, where index 1 means that both configurations are exactly identical. If the Jaccard Index is 1, then both system configurations are identical. Likewise, if the Jaccard Index is 0, then both system configurations are non-identical. With this Jaccard distance, a system configuration built with similar part numbers can be calculated. The Jaccard Index can be used to define a test module that needs to be executed against each system configuration, where the test module definition can be based on the previous history of test execution and the success or failure test result.

The similarity index algorithm can maintain number of sets. In one example, each system configuration can have two sets: 1) Set One, where each system configuration has parts with failure test results, and 2) Set Two, where each system configuration has parts with successful test results. Next, repeat the same process for each part i.e. two sets. After the previous test results have been modelled in simple terms, test tracking system 206 can utilize algorithms, neural networks or other artificial intelligence techniques such as those described herein to define the relationship between these identifiers (parts, test module or system configuration) and numbers (count of success or failure).

In one example embodiment, the following strategy can be used to compare two system configurations. Using an identifier, a set of parts with successful test results and a set of parts with failure test result, for a similarity index that is based only on the set of test results, the Jaccard Index formula can be used:

$$S(S_1, S_2) = |TS_1 \cap TS_2|/|TS_1 \cup TS_2|$$

In this example embodiment, $S_1$ and $S_2$ can represent two system configurations that are being compared and $TS_1$ and $TS_2$ can be the set of parts in $S_1$ and $S_2$ that have passed the tests successfully. If the same test module is failing in one system configuration, it is assumed that there is an increased chance it will fail in other system configuration. To model this assumption, the Jaccard Index equation can be modified as shown below:

$$S(S_1, S_2) = (|TS_1 \cap TS_2| + |TF_1 \cap TF_2|)/(|TS_1 \cup TS_2 \cup TF_1 \times TF_2|)$$

Instead of just considering the common test successes, the number of common test failure has also been added to the numerator, where $TF_1$ and $TF_2$ represent the test failures for respective system configurations $S_1$ and $S_2$.

If data sets have missing observations, there are a number of options for filling in the missing data points. These include filling in the data for the missing observations with null values, replacing the missing observations with the median for the test data set, using a k-nearest neighbor or expectation-maximization algorithm, or other suitable processes.

Figure 6:
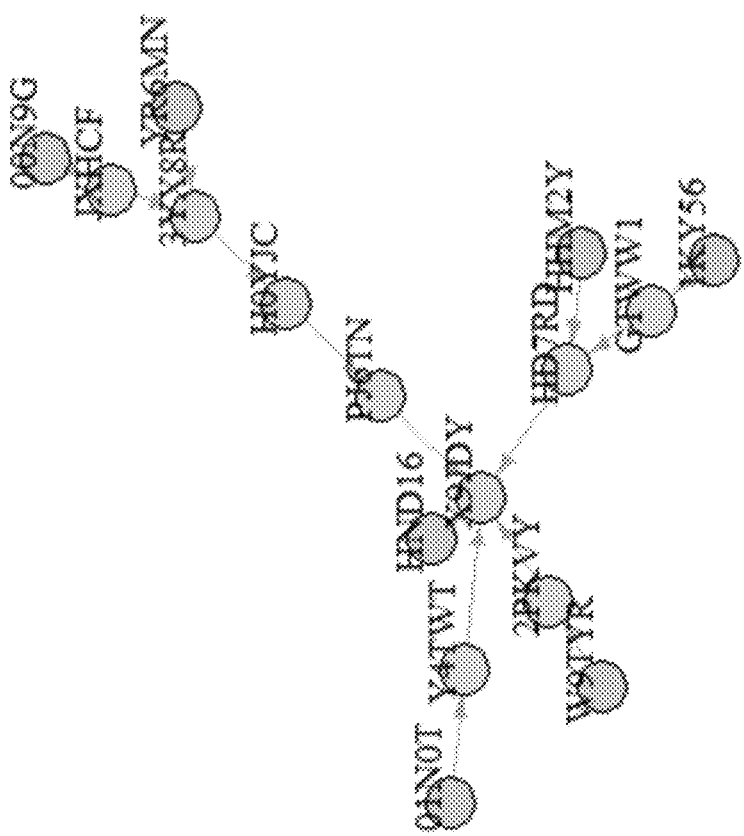
FIG. 6 is a diagram showing relationship and information flow for supplier parts and assembled parts, in accordance with an example embodiment of the present disclosure.

FIG. 6 is a diagram 600 showing relationship and information flow for supplier parts and assembled parts, in accordance with an example embodiment of the present disclosure. Diagram 600 shows an example of how individual test modules can be related to each other, and the impact those tests can have when any test module fails or if testing is omitted.

The network of parts in diagram 600 can be generated by converting a bill of material (BOM) into graph format. This network defines how each part is connected together to create final assembled product. Based on this network graph, the closeness of each part from base part or center of network can be computed. A part having a lower value can be farther away from center of network, and can be given lower priority for testing, as the part can be tested several times within the network. Parts which are nearer to the center of the network can have a higher priority for testing, because any failure introduced at that point will have a higher impact on the finished good.

If previous test results of parts in a launch phase, mass production phase or other suitable phases are available, those test results can be helpful in identifying how the part may perform in a new system configuration or how the combination of parts may perform in a new system. The production test strategy for a new product is typically planned in early design phase before any design is finalized, to allow all relevant test technology-dependent testability aspects to be considered in the design of the product. These defects can be categorized in at least three groups: 1) termination defects (e.g. bridge defects, insufficient termination defects, open termination defects, excess termination defects, termination residue defects, grainy termination defects), 2) placement defects (e.g. missing components, wrong components, misaligned components, inverted components), and 3) component defects (e.g. electrically dead, tolerance defects).

Table 1 is an example of camera defect tests that are typically performed:

TABLE 1

| Types of test on camera | Test Performed at | Category | Defect Classification Defect Category | Sub Group |
|---|---|---|---|---|
| Brightness | Supplier Testing | Cat C | Component | Tolerance |
| Contrast | Supplier Testing | Cat C | Component | Tolerance |
| Hue | Supplier Testing | Cat C | Component | Tolerance |
| Saturation | Supplier Testing | Cat C | Component | Tolerance |
| Sharpness | Supplier Testing | Cat C | Component | Tolerance |
| White Balance | Supplier Testing | Cat C | Component | Tolerance |
| Backlight Compensation | Supplier Testing | Cat C | Component | Tolerance |
| Gamma | Supplier Testing | Cat C | Component | Tolerance |
| Power consumption | Supplier Testing | Cat C | Component | Tolerance |
| Zoom | Supplier Testing | Cat C | Component | Tolerance |
| Tilt | Supplier Testing | Cat C | Component | Tolerance |
| Pan | Supplier Testing | Cat C | Component | Tolerance |
| Exposure | Supplier Testing | Cat C | Component | Tolerance |
| Camera Imaging | Assembly Testing | Cat I | Component | Tolerance |
| DMIC Test | Assembly Testing | Cat I and Cat B | Component | Tolerance |
| Query of PID\VID | Assembly Testing | Cat B | Placement | Misaligned component |
| DRAM Test | In Rack Testing | Cat R | Component | Tolerance |
| Sensor Communication Test | In Rack Testing | Cat R | Placement | Wrong component |
| Firmware CRC Test | In Rack Testing | Cat R | Termination | Bridge |
| Device Enumeration Test | In Rack Testing | Cat R | Termination | Open |
| Registers Test | In Rack Testing | Cat R | Component | Tolerance |
| Controller Test | In Rack Testing | Cat R | Component | Tolerance |
| Luminance Test | In Rack Testing | Cat R | Component | Tolerance |
| Blink LED Test | In Rack Testing | Cat R | Component | Tolerance |

After all defects have been classified, the criteria that can impact the test process are identified. These criteria can be used to measure the impact and drive priority of each type of test module in the manufacturing life cycle. An example of these test impact criteria is shown in Table 2:

TABLE 2

| Criteria | Description | Source of measurement | Dimensions of Value |
|---|---|---|---|
| Part Similarity Index | How much this system configuration with historical data to compare | ML algorithm | Number value between 0 to 10 |

TABLE 2-continued

| Criteria | Description | Source of measurement | Dimensions of Value |
|---|---|---|---|
| Test Classification | Weightage calculated for each test module at respective test location | ML algorithm | Number value between 0 to 10 |
| Terminations Points | For a given part total no of termination point | Absolute scale value captured at the time of system design. External dependency | If count between 1 to 10, then 1 If count between 11 to 20, then 2 |
| Component Count | No of component used to build system | Absolute scale value captured at the time of system design. External dependency | If count between 1 to 10, then 1 If count between 11 to 20, then 2 |
| Time to debug | Average time spent if system ignored test module | Absolute scale value captured by RCA system. External dependency | If time between 1 to 30 minutes, then 1 If time between 30 to 60 minutes, then 2 |
| BOM complexity | Physical depth in hierarchical structure of Part in Finished Unit | ML algorithm | Decimal value between 0 to 1 |
| Part Integration | How part is interfacing to others. E.g. Plug and Play setup are simple one | Absolute scale value captured at the time of system design. External dependency | If PCB layer or copper plate more than one, then 10 If Plug and Play then 3 |
| Ease of test | How easy to test in subsequent manufacturing location like test environment | Absolute scale value captured at the time of system design. External dependency | If test module needs pattern testing the 10 If no physical equipment is required, then 7 |
| Cost of replacement | Transportation, warehouse and legal complexity in returning | Absolute scale value captured at the time of system design. External dependency | Number value between 0 to 10 |
| PLC Stage | System identified product life cycle (PLC) stage and useful in comparative study | ML algorithm | If Design Validation Test and no sample data, then 10 If Design Validation Test with sample data then 8 If new product introduction and no sample data then 7 |

Table 3 is an example of a pairwise criteria comparison against a single part, based on Tables 1 and 2.

TABLE 3

| | Part Similarity Index | Test Classification | Terminations Points | Component Count | Time to debug | BOM complexity | Part Integration | Ease of test | Cost of replacement | PLC Stage |
|---|---|---|---|---|---|---|---|---|---|---|
| Part Similarity Index | 1 | 8 | 4 | 5 | 6 | 3 | 2 | 8 | 4 | 8 |
| Test Classification | 1/8 | 1 | 4 | 5 | 7 | 3 | 2 | 8 | 4 | 8 |
| Terminations Points | 1/4 | 1/4 | 1 | 5 | 8 | 3 | 2 | 3 | 4 | 8 |
| Component Count | 1/5 | 1/5 | 1/5 | 1 | 8 | 3 | 2 | 3 | 4 | 8 |
| Time to debug | 1/6 | 1/7 | 1/8 | 1/8 | 1 | 3 | 2 | 8 | 4 | 8 |
| BOM complexity | 1/3 | 1/3 | 1/3 | 1/3 | 1/3 | 1 | 2 | 8 | 4 | 8 |
| Part Integration | 1/2 | 1/2 | 1/2 | 1/2 | 1/2 | 1/2 | 1 | 8 | 4 | 8 |
| Ease of test | 1/8 | 1/8 | 1/3 | 1/3 | 1/8 | 1/8 | 1/8 | 1 | 4 | 8 |
| Cost of replacement | 1/4 | 1/4 | 1/4 | 1/4 | 1/8 | 1/4 | 1/4 | 1/4 | 1 | 8 |
| PLC Stage | 1/8 | 1/8 | 1/8 | 1/8 | 1/8 | 1/8 | 1/8 | 1/8 | 1/8 | 1 |
| (Sum)$^{1/10}$ | $(3.03)^{1/10}$ | $(10.93)^{1/10}$ | $(10.87)^{1/10}$ | $(17.66)^{1/10}$ | $(31.20)^{1/10}$ | $(17)^{1/10}$ | $(13.5)^{1/10}$ | $(47.37)^{1/10}$ | $(33.13)^{1/10}$ | $(73)^{1/10}$ |
| | 1.75 | 3.30 | 3.29 | 4.20 | 5.58 | 4.12 | 3.67 | 6.88 | 5.75 | 8.54 |

Once the pairwise criteria dimension value is defined, the priority for each table entry can be calculated based on the respective position as an overall criteria, as shown in TABLE 4:

TABLE 4

|  | Matrix C1 (Pairwise Criteria Wt) | C1/Sum of C1 | Matrix C2 |
|---|---|---|---|
| Part Similarity Index | 1.75 | 1.75/47.08 | 0.04 |
| Test Classification | 3.3 | 3.3/47.08 | 0.07 |
| Terminations Points | 3.29 | 3.29/47.08 | 0.07 |
| Component Count | 4.2 | 4.2/47.08 | 0.09 |
| Time to debug | 5.58 | 5.58/47.08 | 0.12 |
| BOM complexity | 4.12 | 4.12/47.08 | 0.09 |
| Part Integration | 3.67 | 3.67/47.08 | 0.08 |
| Ease of test | 6.88 | 6.88/47.08 | 0.15 |
| Cost of replacement | 5.75 | 5.75/47.08 | 0.12 |
| PLC Stage | 8.54 | 8.54/47.08 | 0.18 |
| SUM | 47.08 |  | 1 |

Based on this algorithm, for a situation where a new product is introduced, the "part similarity matrix" can be used to determine historical test results. These results can be used with the "test classification" criteria defined Table 3. For a new product that has a higher criteria value for "PLC stage," once the product is stabilized, the proposed system can re-calculate a value for the "PLC stage" by analyzing a "degree of confidence" against a test population, as discussed below.

This classification can be used to move from a design phase to mass production in the beginning of the product life cycle development. Many tests are typically executed at that stage, to improve the ability to identify design or manufacturing related issues, such as to advance from a launch phase to a mass production stage (PLC_MASS). Uncertainty associated with the adequacy of testing can be addressed with data showing good yields at safe launch, at which point the start of PLC_MASS can be signaled. From DVT1 to SAFE launch, data analysis of the full test log can be performed to reject the hypothesis of the expected projection of PLC_NPI to PLC_MASS. Another analysis can also be performed for MASS production.

Figure 7:
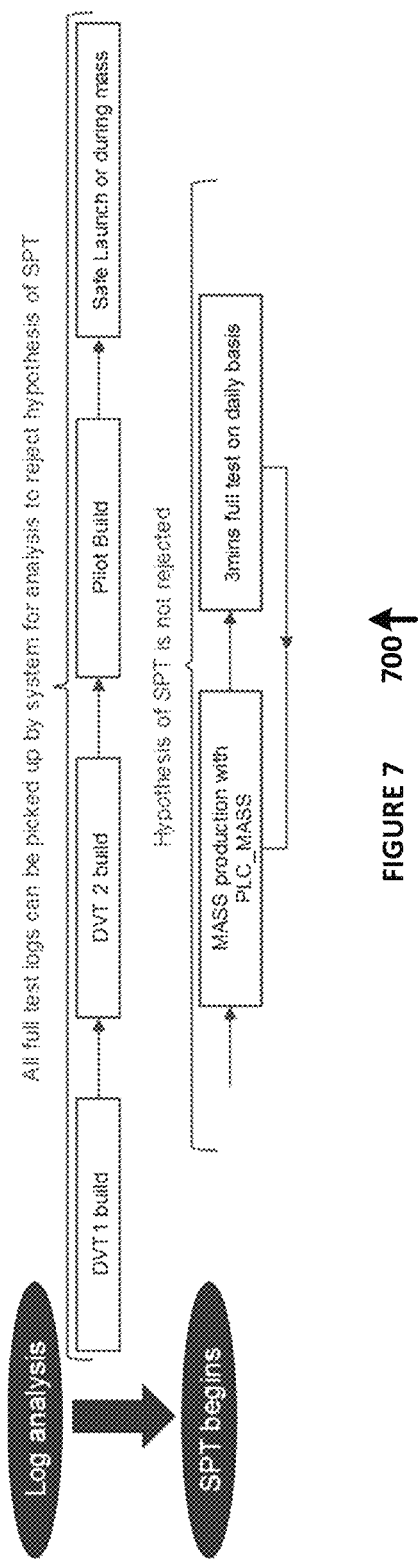
FIG. 7 is a diagram showing a classification technique substantiated by test log data probing and periodical full test, in accordance with an example embodiment of the present disclosure.

FIG. 7 is a diagram 700 showing a classification technique substantiated by test log data probing and periodical full test, in accordance with an example embodiment of the present disclosure. The algorithm can use the figure of defect per million opportunity (DPMO)

$$DPU_x = )(DPMO_x/1000000)*O_x$$

Where
$DPU_x$ = Defects Per Unit
$DPMO_x$ = Defects Per Million Opportunities
$O_x$ = Amount of Opportunities per board, and the subscript "x" refers to a defect category like termination, placement or components.

To facilitate decision making, a 95% confidence level can be computed for comparison with a threshold set. The 95% confidence level can be computed from a population failure, $\dot{p}$.

For confidence intervals on a population proportion p, the population proportion p can represent a fraction of defective items in a population of items. It is often impractical to find the exact value of p, and a point estimate can be used to estimate the true proportion. A sample denoted $\dot{p}$ can then be used as a point estimate for p. The sample proportion can be calculated using (e.g. when a test has x amount failure, 102, with sample size of n=1000):

$$\dot{p} = \frac{x}{n} = \frac{102}{1000} = 0.102$$

At a=0.05, a 100(1−a) %, 95%, the confidence interval on a population proportion p can be obtained using:

$$\dot{p} - z_{a/2}\sqrt{\frac{\dot{p}(1-\dot{p})}{n}} \le p \le \dot{p} + z_{a/2}\sqrt{\frac{\dot{p}(1-\dot{p})}{n}}$$

Continuing from case 1 (Z transform value is 2.576)

$$0.102 - 2.576\sqrt{\frac{0.102(1-0.102)}{1000}} \le$$

$$p \le 0.102 + 2.576\sqrt{\frac{0.102(1-0.102)}{1000}}$$

Therefore, $0.077 \le p \le 0.127$ (confidence level computed)

With a high degree of confidence, the true proportion of tests that contain errors would be between 7.7 percent and 12.7 percent.

FIG. 9 is a flow chart of an algorithm 800 for reducing manufacturing test requirements, in accordance with an example embodiment of the present disclosure. Algorithm 800 can be implemented in hardware or a suitable combination of hardware and software, and can be implemented on one or more processors.

Algorithm 800 begins at 802, where parts are identified. In one example embodiment, the parts can be identified by one or more algorithms operating on a processor of a supplier test system 102, a test category system 110, a test tracking system 206 or other suitable systems that are used to obtain test data for use in analyzing and evaluating an optimal test sequence, a part or system failure probability or other suitable data that can be used to reduce the level of testing for a new or existing component without reducing the effectiveness of the testing. The algorithm then proceeds to 804.

At 804, test results are identified. In one example embodiment, the test results can be associated with a part, a system or other suitable components, can be initial tests, final tests, other suitable tests or a suitable combination of tests. The test results can be identified by one or more algorithms operating on a processor of a supplier test system 102, a test category system 110, a test tracking system 206 or other suitable systems that are used to obtain test data for use in analyzing and evaluating an optimal test sequence, a part or system failure probability or other suitable data that can be used to reduce the level of testing for a new or existing component without reducing the effectiveness of the testing. The algorithm then proceeds to 806.

At 806, an access key is requested. In one example embodiment, the access key can be requested by one or more algorithms operating on a processor of a supplier test system 102, a test category system 110, a test tracking system 206 or other suitable systems that are used to obtain test data for use in analyzing and evaluating an optimal test sequence, a part or system failure probability or other suitable data that can be used to reduce the level of testing for a new or existing component without reducing the effectiveness of the testing. The algorithm then proceeds to 808.

At 808, the access key is stored. In one example embodiment, the access key can be stored by one or more algorithms operating on a processor of a supplier test system 102, a test category system 110, a test tracking system 206 or other suitable systems that are used to obtain test data for use in analyzing and evaluating an optimal test sequence, a part or system failure probability or other suitable data that can be used to reduce the level of testing for a new or existing component without reducing the effectiveness of the testing. The algorithm then proceeds to 810.

At 810, it is determined whether there are more test results and associated access keys. In one example embodiment, the determination can be made by one or more algorithms operating on a processor of a supplier test system 102, a test category system 110, a test tracking system 206 or other suitable systems that are used to obtain test data for use in analyzing and evaluating an optimal test sequence, a part or system failure probability or other suitable data that can be used to reduce the level of testing for a new or existing component without reducing the effectiveness of the testing. If it is determined that there are more, the algorithm returns to 806, otherwise the algorithm then proceeds to 812. In an alternative embodiment, a state machine can be used to continuously check for the availability of new test results, test results can be provided when available, a flag indicating the availability of test results can be provided or other suitable data or processes can also or alternatively be used.

At 812, sets of associated test data are identified. In one example embodiment, the sets of test data can be identified as a function of a type of component, a type of system that the component is used in, a design feature or in other suitable manners. The algorithm then proceeds to 814.

At 814, a Jaccard Index algorithm or other suitable algorithms are applied to the sets of test data. In one example embodiment, the Jaccard Index algorithm can be used to evaluate the applicability of test data results from a first set to test data forecasts for the second set, or other suitable processes can be used to evaluate the accuracy and suitability of test data for one or more existing designs to a new design. The algorithm then proceeds to 816.

At 816, a test sequence is identified. In one example embodiment, the test sequence can include one or more tests on components, boards, assemblies or other suitable items during a manufacturing process, as a function of the location of the item, the ease or difficulty of replacing the item or other suitable factors. The algorithm then proceeds to 818.

At 818, a baseline probability for detecting a failed component using the test sequence is determined. In one example embodiment, the baseline probability can be generated using a Jaccard Index algorithm or in other suitable manners. The algorithm then proceeds to 820.

At 820, one of the tests of the test sequence is eliminated. In one example embodiment, each test can be eliminated to determine the impact on the reliability and efficacy of the testing, combinations of tests can be eliminated or other suitable processes can also or alternatively be used. The algorithm then proceeds to 822.

At 822, a modified probability of detecting a failed component is generated. In one example embodiment, the modified probability can be generated using a Jaccard Index algorithm or in other suitable manners. The algorithm then proceeds to 824.

At 824, it is determined whether there are additional testing configurations for analysis. If it is determined that there are additional testing configurations, the algorithm returns to 820, otherwise the algorithm then proceeds to 826.

At 826, an optimal test set sequence is selected. In one example embodiment, the cost of the testing, the cost of replacing a failed component or item or other suitable parameters can be used to analyze a level of testing and test sequence that provides the maximum economic benefit.

In operation, algorithm 800 allows testing to be analyzed to determine whether the cost of testing is justified by the benefits obtained by that testing, whether a more optimal test sequence can be determined, whether a test sequence for a new product is likely to be effective in determining the reliability of the new product and other suitable data. While algorithm 800 is shown as a flow chart algorithm, it can also or alternatively be implemented using object-oriented programming, state diagram, a ladder diagram or other suitable programming paradigms.

The present disclosure provides a number of benefits. One benefit is the removal of duplicate testing by sharing test results. By reducing the number of tests to an adequate level, the end to end manufacturing cycle time can be reduced. Full test traceability can be provided at each component level, and a standardized diagnostics approach can be applied. Robust sampling of the test approach can be used for performing a quality check, and different component suppliers can have different weightage, where the weightage can be defined with data insight using AI. Supplier and vendor insights can be helpful for negotiating a rate for parts, a user can refine test items based on learning of historical test results, and ineffective tests can be reduced. The result will be LEAN manufacturing test. Real-time information can be collected automatically and continually, which will be helpful in discrete-event simulation and test performance.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for testing electrical components comprising:
   a supplier test system operating on a first processor and configured to generate test data for a component and to store the component test data on a block chain;
   a board level test system operating on a second processor and configured to generate test data for a board and to store the board test data on the block chain; and
   a test tracking system configured to request a first key to access the component test data and a second key to access the board test data and to store the first key and the second key.

2. The system of claim 1 further comprising an assembly test system operating on a third processor and configured to generate test data for an assembly and to store the assembly test data on the block chain, wherein the test tracking system is further configured to request a third key to access the assembly test data and to store the third key.

3. The system of claim 1 further comprising a rack test system operating on a third processor and configured to generate test data for a rack and to store the rack test data on the block chain, wherein the test tracking system is further configured to request a third key to access the rack test data and to store the third key.

4. The system of claim 1 wherein the test tracking system is configured to receive first set data identifying the board test data and the component test data and second set data and to perform a Jaccard Index analysis on the first set data and the second set data.

5. The system of claim 1 wherein the test tracking system is configured to receive an advanced shipping notice and to generate piece part query data from the advanced shipping notice.

6. The system of claim 1 further comprising:
   an assembly test system operating on a third processor and configured to generate test data for an assembly and to store the assembly test data on the block chain, wherein the test tracking system is further configured to request a third key to access the assembly test data and to store the third key; and a rack test system operating on a fourth processor and configured to generate test data for a rack and to store the rack test data on the block chain, wherein the test tracking system is further configured to request a fourth key to access the rack test data and to store the fourth key.

7. The system of claim 1 further comprising:
an assembly test system operating on a third processor and configured to generate test data for an assembly and to store the assembly test data on the block chain, wherein the test tracking system is further configured to request a third key to access the assembly test data and to store the third key; and
wherein the test tracking system is configured to receive first set data identifying the board test data and the component test data and second set data and to perform a Jaccard Index analysis on the first set data and the second set data.

8. The system of claim 1 further comprising:
an assembly test system operating on a third processor and configured to generate test data for an assembly and to store the assembly test data on the block chain, wherein the test tracking system is further configured to request a third key to access the assembly test data and to store the third key; and
wherein the test tracking system is configured to receive an advanced shipping notice and to generate piece part query data from the advanced shipping notice.

9. A method for testing electrical components comprising:
generating test data for a component using component test equipment;
storing the component test data on a block chain of a data memory device;
generating test data for a board using board test equipment;
storing the board test data on the block chain of the data memory device;
requesting a first key to access the component test data;
requesting a second key to access the board test data; and
storing the first key and the second key.

10. The method of claim 9 further comprising:
generating test data for an assembly;
storing the assembly test data on the block chain;
requesting a third key to access the assembly test data; and
storing the third key.

11. The method of claim 9 further comprising:
generating test data for a rack;
storing the rack test data on the block chain;
requesting a third key to access the rack test data; and
storing the third key.

12. The method of claim 9 further comprising:
receiving first set data identifying the board test data and the component test data and second set data; and
performing a Jaccard Index analysis on the first set data and the second set data.

13. The method of claim 9 further comprising:
receiving an advanced shipping notice; and
generating piece part query data from the advanced shipping notice.

14. A method for testing electrical components comprising:
generating test data for a component using component test equipment;
storing the component test data on a block chain of a data memory device;
generating test data for a board using board test equipment;
storing the board test data on the block chain of the data memory device;
requesting a first key to access the component test data using the data memory device;
requesting a second key to access the board test data; and
storing the first key and the second key.

15. The method of claim 14 further comprising:
generating test data for an assembly; and
storing the assembly test data on the block chain.

16. The method of claim 15 further comprising;
requesting a third key to access the assembly test data; and
storing the third key.

17. The method of claim 14 further comprising:
generating test data for a rack; and
storing the rack test data on the block chain.

18. The method of claim 17 further comprising:
requesting a third key to access the rack test data; and
storing the third key.

19. The method of claim 14 further comprising:
receiving first set data identifying the board test data and the component test data and second set data; and
performing a Jaccard Index analysis on the first set data and the second set data.

20. The method of claim 14 further comprising:
receiving an advanced shipping notice; and
generating piece part query data from the advanced shipping notice.

\* \* \* \* \*